(12) United States Patent
Xing et al.

(10) Patent No.: US 8,275,320 B1
(45) Date of Patent: Sep. 25, 2012

(54) METHODS AND SYSTEMS FOR CHANNEL ESTIMATION IN A WIRELESS COMMUNICATION NETWORK

(75) Inventors: Guanbin Xing, Issaquah, WA (US);
Manyuan Shen, Bellevue, WA (US);
Xun Shao, Bellevue, WA (US)

(73) Assignee: Adaptix, Inc., Carrollton, TX (US)

( * ) Notice: Subject to any disclaimer, the term of this patent is extended or adjusted under 35 U.S.C. 154(b) by 1179 days.

(21) Appl. No.: 12/024,675

(22) Filed: Feb. 1, 2008

(51) Int. Cl.
*H04B 1/00* (2006.01)
*H04B 15/00* (2006.01)

(52) U.S. Cl. .................. 455/63.1; 455/67.11; 370/328
(58) Field of Classification Search .............. 455/63.1, 455/67.11, 423; 370/328
See application file for complete search history.

(56) References Cited

U.S. PATENT DOCUMENTS
2008/0298524 A1* 12/2008 Koorapaty et al. ........... 375/348

OTHER PUBLICATIONS

IEEE Std 802.16e-2005 and IEEE Std 802.16/2004/Cor1-2005; Feb. 28, 2006; 864 pages.

* cited by examiner

*Primary Examiner* — Lewis West
(74) *Attorney, Agent, or Firm* — Martin & Ferraro, LLP

(57) ABSTRACT

Methods and systems for improved channel estimation that jointly consider interference contributions and noise contributions separately. Associated method involve measuring pilot channel signals at a receiver and then determining what component of the measured pilot channel signals are attributable to a serving BS and what component of the measured pilot channel signals are attributable to an interfering BS. This information is used to determine a product of the pilot channel signals attributable to the serving BS and the pilot channel signal attributable to the interfering BS, where the found product is used to estimate said channel.

18 Claims, 6 Drawing Sheets

METHODS AND SYSTEMS FOR CHANNEL ESTIMATION IN A WIRELESS COMMUNICATION NETWORK

TECHNICAL FIELD

The present invention generally relates to systems and methods for improving channel estimation in a communications network. More specifically, the present invention relates to systems and methods for improving channel estimation in networks employing aggressive frequency reuse schemes.

BACKGROUND OF THE INVENTION

The capacity of cellular networks can be increased by employing methods that allow the same frequency to be used for different transmissions, in different areas of the network. These "frequency reuse" methods have a related frequency reuse factor, which is defined as the rate at which the same frequency can be reused in the network. For systems that are not sectorized, the reuse factor is defined as 1/K, where K is the number of cells in the network that cannot use the same frequencies for transmission. According to prevalent types of networks, common values for the frequency reuse factor are $1/3$, $1/4$, $1/7$, $1/9$ and $1/12$.

It should be understood that the concepts of frequency reuse have not been completely unified in the industry. For instance, some reuse schemes are defined in terms of additional variables other than 1/K, as discussed above. By way of example, consider a cellular network according to the IEEE 802.16e standard, also known as a Worldwide Interoperability for Microwave Access (WiMAX) network. For instance, a popular scheme within the WiMAX context incorporates an n, m, k naming convention, where n refers to the number of duplicated cells within the network, m represents the number of sectors within each cell (defined by, for example, the number of directional antennas at each base station (BS)), and k represents the number of frequencies used within each cell. Two common reuse patterns in the WiMAX context are n=1, m=3, and k=1; and n=1, m=3, and k=3, which are referred to as "reuse 1" and "reuse 3," respectively.

Achieving a frequency reuse factor of one is desirable insomuch as doing so increases network communication capacity. However, in general, achieving such an aggressive reuse factor (i.e., achieving a reuse of or about one) presents its own set of problems, which should be obviated to avoid compromising network capacity. In addition to background noise, a primary problem associated with an aggressive reuse factor is interference from neighboring transmitters near cell or sector boundaries. This problem requires that data packet frame structures be designed to accommodate strong interfering signals along cell or sector boundaries. Otherwise, portions of the data frame structure, e.g., pilot symbols, will collide with one another, causing undue interference even when a cell is lightly-loaded.

Consider again the mobile WiMAX network discussed above where a frequency reuse factor of one (1) is used to maximize network capacity and eliminate tedious cell planning. As mentioned, such an aggressive reuse pattern causes strong inter-cell interference along the cell boundaries. For instance, in a typical 3-tier/19-cell/3-sector environment where no AAS/beamforming gain is applied, downlink communications will typically experience very strong interference such that approximately 50% of the signals will have a SINR of 0 dB or less, 30% of the signals will have a SINR of −5 dB or less, and 10% of the signals will have a SINR of −10 dB or less.

This problem is compounded by the fact that, according to the WiMAX standard, data frame structures are not well-designed to accommodate the inference. That is, according to the WiMAX standard, the PUSC zone of a data frame is a mandatory zone and contains critical information for every frame transmission. However, the pilot symbols of the PUSC zone are constantly broadcast regardless of the traffic load. As such, the PUSC pilot symbols are arranged such that the pilot symbols in different cells collide with one another at a high rate. Even when cells in the network are lightly-loaded, the pilot symbols are subject to heavy interference. As a consequence, the pilot symbols effectively become a communication bottleneck. This has a range of negative effects, including a significant restriction on channel estimation.

While this problem is not exclusive to WiMAX, it is particularly noticeable in the WiMAX context. For example, in other types of communication schemes, pilot symbols can relatively easily be separated from one another in different cells or different sectors. For instance, in CDMA or GSM systems, pilot symbols can be easily separated because of the code structure. In contrast, in an OFDM system (e.g., WiMAX) pilot symbols overlap one another as each are transmitted on specific subcarriers, where the subcarriers themselves overlap one another. This makes it especially difficult to filter out pilot symbols for channel estimation purposes.

In view of the above it can be seen that, in networks such as WiMAX networks, the measurement of pilot channels for channel estimation purposes is restricted by the heavy interference at those pilot channels. Currently available systems that attempt to deal with this problem are limited insomuch as they simply treat all measured interference as noise. In a WiMAX network, the pilot symbols of different cells or sectors are randomly scrambled. As such, pilot interference from neighboring cells or sectors appears as white-noise at the receiver. Known systems that apply traditional Minimum Mean Square Error (MMSE) channel estimator algorithms simply treat the interference as noise and thus are unable to determine what interference is attributable to other transmitters. In these systems, the inference can be reduced, but not by a satisfactory amount. As a practical matter, traditional MMSE channel estimator gains are limited to around 3-5 dB in most cases. So, with a boundary area having an SINR value at or about 0 dB, the improvement signal would be around 3-5 dB, which is barely sufficient to support common modulation schemes, e.g., QPSK coding. According to these types of solutions, channel estimation is not satisfactory because, by simply treating all interference as noise, these solutions fail to leverage the inherent structure of the interfering signals.

BRIEF SUMMARY OF THE INVENTION

Accordingly, systems and methods described herein consider interference from transmitters separately from background noise for channel estimation purposes. These systems and methods yield significant channel estimation improvement at or near cell boundaries. According to a particular embodiment, channel estimation is performed by measuring one or more pilot channels at a receiver and then determining interference levels at those pilot channels. The method also involves determining what portion of said interference level is attributable to noise and subtracting the determined noise from the total interference level.

According to another embodiment, a method involves measuring pilot channel signals at a receiver and then determining what component of the measured pilot channel signals are attributable to a serving BS and what component of the measured pilot channel signals are attributable to an interfering BS. This information is used to determine a product of the pilot channel signals attributable to the serving BS and the pilot channel signal attributable to the interfering BS, where the found product is used to estimate said channel.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Systems and methods described herein provide for improved channel estimation in cellular networks, particularly in networks having a relatively low, i.e., aggressive frequency reuse factor. In accomplishing such, preferred systems and methods measure the total undesirable signal level received at one or more receivers in the network. The measured undesirable signals are further examined to determine what amount of the undesirable signals are attributable to noise, e.g., background noise, and what amount of the undesirable signals are attributable to signals from interfering transmitters. According to preferred embodiments, channel estimation is based on pilot channel signal measurements. As such, pilot channel measurements are taken to determine the level of interference attributable to interfering pilot channels. Isolating interference signals allows for a better estimation of the actual characteristics of the measured channel, because doing so determines how much of the signal is due to true noise as opposed to interfering signals. This is in contrast to other systems that perform channel estimation based on pilot measurements but fail to distinguish between noise and interfering signals from other BSs. This failure often gives a false impression of the noise level associated with a given channel, and thereby restricts estimation of that channel.

Figure 1:
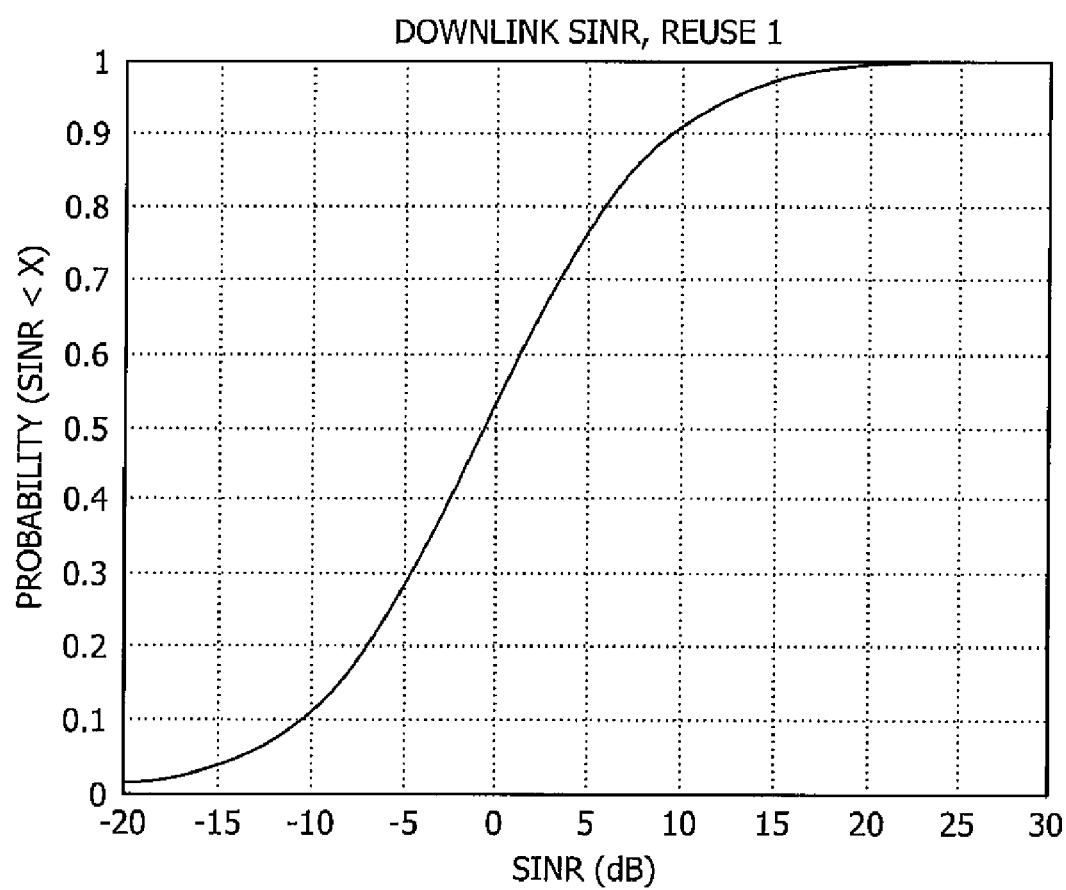
FIG. 1 is a depiction of a typical SINR distribution for a WiMAX system with a frequency reuse factor of one.

For a more complete understanding of the invention, reference is made to FIG. 1, which depicts a typical SINR distribution for downlink communications in a 3-tier/19-cell/3-sector WiMAX system having a frequency reuse of one (1). According to FIG. 1, the solid line represents the SINR distribution. As seen, if no modification (e.g., AAS/beam forming gain) is applied, downlink communications will experience very strong interference, i.e., approximately 50% of downlink signals will have a SINR value of 0 dB or less, 30% of the downlink signals will have a SINR value of −5 dB or less, and 10% of the downlink signals will have a SINR value of −10 dB or less. As will be discussed in greater detail below, the system and methods described herein improve the SINR value of communication in such a network.

Figure 2:
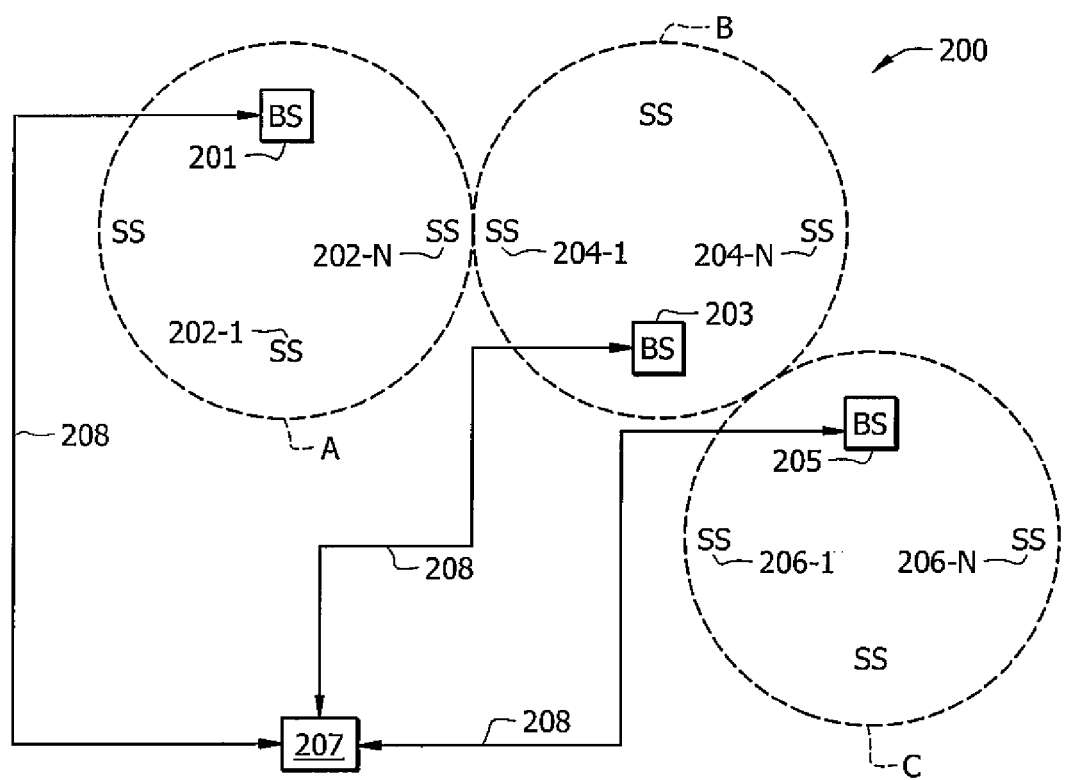
FIG. 2 is a cellular network according to an embodiment of the present invention.

Embodiments of the present invention can be implemented in different communication networks. Referring to FIG. 2, communication network 200 is representative of some of the various communication networks in which preferred embodiments can be implemented. As seen, communication network 200 comprises different cells or sectors that, in combination, form a communication network. BS 201 communicates with SS 202-1 through 202-N and vice versa in cell A, BS 203 communicates with SSs 204-1 though 204-N and vice versa in cell B, and BS 205 communicates with SSs 206-1 through 206-N and vice versa in cell C. Each BS may have a single antenna for serving a corresponding cell, or multiple, directional antennas serving corresponding sectors within each cell. Each of BS 201, 203, and 205 communicate on "backhaul" network 207 via communication means 208. Communication means 208 may comprise phone lines, RF communication components, and the like as known in the art.

Figure 2A:
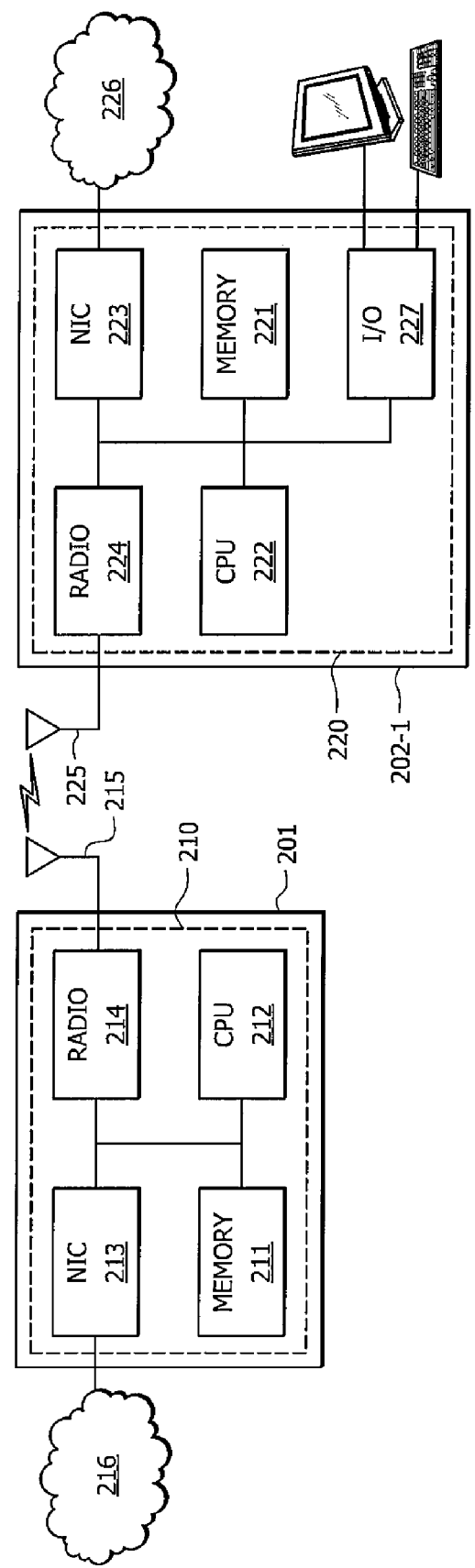
FIG. 2A shows detail with respect to a BS and a SS adapted according to an embodiment of the present invention

FIG. 2A shows detail with respect to BSs according to the preferred embodiment, e.g., BS 201, and SSs according to the preferred embodiment, e.g., SS 202-1. BSs of the illustrated embodiment may, for example, comprise a network access point, a network router, a network switch, a network gateway, etc. adapted to provide operation as described herein. SSs of the illustrated embodiment may, for example, comprise a personal computer, a personal digital assistant (PDA), a cellular telephone, a server, and/or other processor based information processing or communication device. It should be appreciated that various SSs may be mobile or stationary. Similarly, although BSs are traditionally stationary, embodiments of the invention may implement a mobile BS configuration.

The illustrated embodiment of BS 201 includes memory 211, central processing unit (CPU) or processor 212, network interface card (NIC) 213, radio 214, and antenna 215. The foregoing functional blocks may be provided in discrete components or may be combined into one or more integrated components. For example, embodiments of the present invention may utilize one or more application specific integrated circuits (ASICs) (e.g., ASIC 210) to provide the functional blocks shown. Of course, embodiments of the invention may include additional or alternative functional blocks with respect to a BS adapted according to the concepts described herein, if desired.

Memory 211, such as may comprise integrated circuit memory modules, disk memory, magnetic memory, optical memory, flash memory, and/or the like, is preferably used to store instruction sets (e.g., control programs) and data. An instruction set stored by memory 211 preferably provides code defining operation of BS 201 in accordance with the concepts of the present invention. Instruction sets stored by memory 211 may additionally include programs for providing other desired operations, such as programs that exchanges data with other nodes via network 216, programs for carrying out communications protocols, etc.

CPU 212 may comprise any processor architecture suitable for providing operation according to the concepts of the present invention, such as a PENTIUM processor available from Intel Corporation, a 680X0 processor available from Motorola, Inc., a POWERPC processor available from the AIM alliance (Apple-IBM-Motorola), etc. CPU 212 preferably processes instructions of an instruction set in order to execute programs stored in memory. CPU 212 may further operate to control communication, such as by supplying control signals to NIC 213 and/or radio 214. CPU 212 of a preferred embodiment generally operates to determine particular nodes which are suitable for SDMA communication, assigning resources for use with respect to the nodes, determining beam configurations, and coordinating operation of the functional blocks of BS 201. Although BS 201 may utilize CPU 212 to provide primary operational control with respect to the functional aspects of the BS, embodiments of the invention may implement a more distributed processing architecture. For example, NIC 213 and/or radio 214 may include some processor capability and, thereby, provide at least some level of control with respect to communication of information via respective links.

NIC 213 provides an interface to network 216. NIC 212 preferably includes hardware and software for carrying out low-level protocols for communication via network 216. Accordingly, NIC 213 facilitates BS 201 communicating data with other nodes, such as may comprise servers, SSs, BSs, etc., that are accessible by network 216.

Radio 214 provides an interface to antenna 215 and the wireless links provided thereby. Radio 214 preferably includes modulation and signaling features, e.g., modem and/or radio, that drive the antenna 215 thus allowing the wireless device to transmit and receive data to and from other nodes, such as may comprise servers, SSs, other BSs, etc.

Antenna 215 provides a transducer for providing an air interface. It should be appreciated that, although the illustrated embodiment shows a single antenna, antenna 215 may comprise a plurality of individual antennas, a plurality of antenna elements cooperative to provide an antenna array (e.g., a phased array), and/or the like operable to provide beams or antenna patterns as described herein. Moreover, although antenna 215 is represented as a radio frequency (RF) transducer in the illustrated embodiment, it should be appreciated that wireless communication links based upon other signal propagation technologies may be utilized in addition to or in the alternative to RF links according to the present invention. For example, rather than a RF transducer, antenna 215 may comprise a light energy transducer, such as a LASER transceiver or infrared (IR) light emitting diode (LED) for providing a wireless link.

Network 216 may comprise a LAN, a MAN, a WAN (e.g., the Internet), a wireless network, a cable transmission system, the public switched telephone network (PSTN), a satellite network, and/or the like. BS 201 may provide a point of presence on network 216 for SSs 121-123. Network 216 of embodiments provides a backbone for interconnecting a plurality of BSs in a cooperative wireless network.

The illustrated embodiment of SS 202-1 includes memory 221, CPU 222, NIC 223, radio 224, antenna 225, and input/output (I/O) 227. The foregoing functional blocks may be provided in discrete components or may be combined into one or more integrated components. For example, embodiments of the present invention may utilize one or more ASICs (e.g., ASIC 220) to provide the functional blocks shown. Of course, embodiments of the invention may include additional or alternative functional blocks with respect to a SS adapted according to the concepts described herein, if desired. It should be appreciated that, although detail with respect to SS 202-1 is shown, other SSs, such as SS 204-1 and 206-1, may be similarly configured.

As with memory 211 discussed above, memory 221 may comprise integrated circuit memory modules, disk memory, magnetic memory, optical memory, flash memory, and/or the like, and is preferably used to store instruction sets and data. An instruction set stored by memory 221 preferably provides code defining operation of SS 202-1 in accordance with the concepts of the present invention. Instruction sets stored by memory 211 may additionally include programs for providing other desired operations, such as programs that exchanges data with other nodes via network 216, programs for carrying out communications protocols, various user application programs (e.g., web browser, data processing, personal productivity, and the like), etc.

As with CPU 212 discussed above, CPU 222 may comprise any processor architecture suitable for providing operation according to the concepts of the present invention, such as a PENTIUM processor available from Intel Corporation, a 680X0 processor available from Motorola, Inc., a POWERPC processor available from the AIM alliance (Apple-IBM-Motorola), etc. CPU 222 preferably processes instructions of an instruction set in order to execute programs stored in memory. CPU 222 may further operate to control communication, such as by supplying control signals to NIC 223 and/or radio 224, and input/output, such as by controlling I/O 227 to accept data input and/or provide data output. CPU 222 of a preferred embodiment generally operates to determine communication characteristics for various beams, provide feedback in the form or antenna beam index information and/or channel characteristic information to a control system such as BS 201, and coordinating operation of the functional blocks of SS 202-1. Although SS 202-1 may utilize CPU 212 to provide primary operational control with respect to the functional aspects of the SS, embodiments of the invention may implement a more distributed processing architecture. For example, NIC 223 and/or radio 224 may include some processor capability and, thereby, provide at least some level of control with respect to communication of information via respective links.

NIC 223 provides an interface to network 226. NIC 223 preferably includes hardware and software for carrying out low-level protocols for communication via network 226. Accordingly, NIC 223 facilitates SS 202-1 communicating data with other nodes, such as may comprise servers, SSs, BSs, etc., that are accessible by network 226. It should be appreciated that embodiments of a SS may not be coupled to a network such as network 226 and thus may omit NIC 223. For example, a wireless PDA or cellular telephone may include radio 224 for providing a wireless link without including NIC 223 for coupling to network 226. However, other SS configurations, such as a personal computer, a server, or a gateway, may include NIC 223 to provide communication both through the wireless link provided by radio 224 and network 226, such as may comprise a LAN or other network.

Radio 224 provides an interface to antenna 225 and the wireless links provided thereby. Radio 224 preferably includes modulation and signaling features, e.g., modem and/or radio, that drive the antenna 225 thus allowing the wireless device to transmit and receive data to and from other nodes, such as may comprise servers, SSs, other BSs, etc.

Antenna 225 provides a transducer for providing an air interface. As with antenna 215 discussed above, it should be appreciated that, although the illustrated embodiment shows a single antenna, antenna 225 may comprise a plurality of individual antennas, a plurality of antenna elements cooperative to provide an antenna array (e.g., a phased array), and/or the like operable to provide beams or antenna patterns as described herein. Although illustrated as an RF transducer, where antenna 215 provides wireless communication links based upon signal propagation technologies other than RF, antenna 225 provides a corresponding transducer configuration.

Similar to network 216 discussed above, network 226 may comprise a LAN, a MAN, a WAN (e.g., the Internet), a wireless network, a cable transmission system, the PSTN, a satellite network, and/or the like. SS 202-1 may, for example, provide a gateway between network 216 and the wireless links provided according to the present invention.

I/O 227 provides an interface for data input and/or data output at SS 202-1. For example, I/O 227 may be coupled to one or more input device, such as a keyboard, mouse, digitizing tablet, scanner, microphone, etc., in order to facilitate input of data at SS 202-1. I/O 227 may additionally or alternatively be coupled to one or more output device, such as a monitor, a printer, a speaker, etc., in order to facilitate output of data at SS 202-1.

Figure 3:
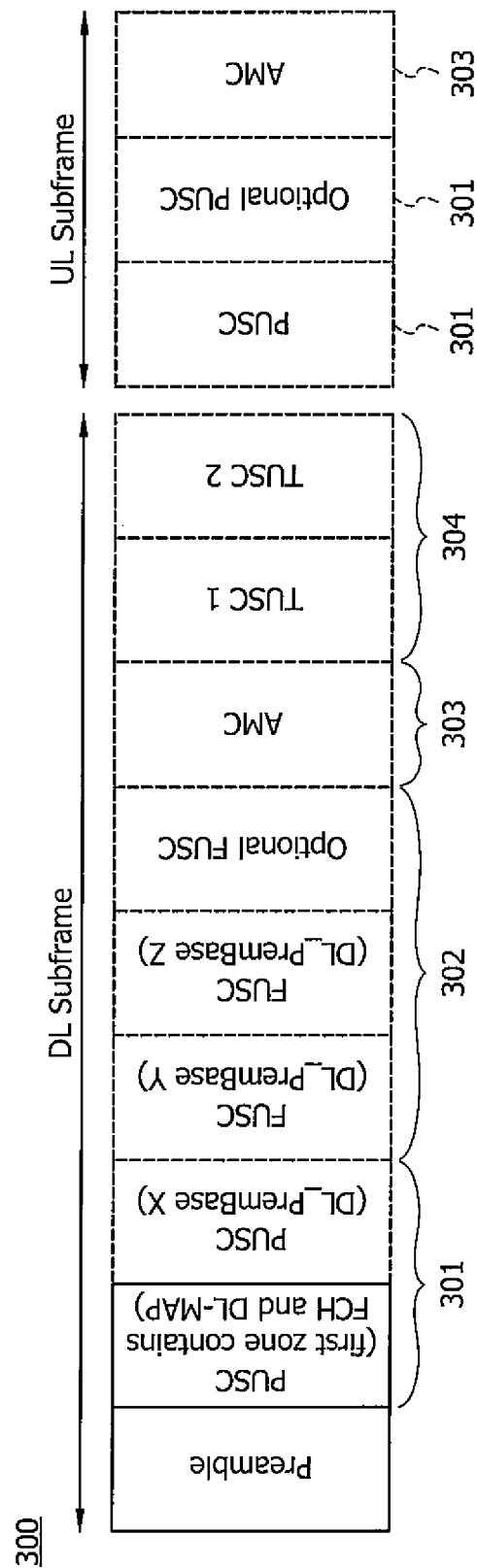
FIG. 3 is a data subframe structure according to an embodiment of the present invention.

As mentioned, preferred embodiments of the systems and methods described herein can be applied to various communication networks. However, the systems and methods are thought to be particularly advantageous when implemented in the context of a communication network according to the IEEE 802.16e standard, otherwise referred to as a Worldwide Interoperability for Microwave Access (WiMAX) network. This is true because WiMAX data packets comprise pilot symbols that can be directly measured. As such, to provide for a more efficient discussion, FIG. 3 depicts WiMAX subframes 300 of a WiMAX data frame structure. As seen, WiMAX data subframe 300 comprises multiple zones, including PUSC zone 301, FUSC zone 302, AMC zone 303, and TUSC zone 304. PUSC zone 301, outlined by a solid line, is a mandatory zone in every WiMAX frame and carries the most critical control information for the entire frame transmission. FUSC zone 302, AMC zone 303, and TUSC zone 304 are optional. According to the WiMAX standard, all users (e.g., mobile stations) share the same set of pilots in PUSC zone 301 and FUSC zone 302. Therefore, the pilots are constantly broadcast regardless of the traffic load with a cell or sector. This, of course, leads to strong pilot channel interference. For other zones, such as AMC zone 303 and TUSC zone 304, pilot symbols are unicast to individual users; as such, the interference is less severe when cell-loading is low. In view of the above, pilot interference problems described herein are generally more prevalent in PUSC zone 301 and FUSC zone 302. Although a discussion of the preferred embodiments will largely focus on discussions of PUSC zone 301, the inventive concepts described herein can easily be extended to other zones as well.

According to a preferred embodiment, systems and methods described herein establish improved channel estimation in a communication network by modifying Minimum Mean Square Error (MMSE) channel estimation algorithms. In the case at hand, we assume a block of N number of subcarriers having M number of pilots spreading across. The channel estimation involves channel observations at those pilot subcarriers, which is represented by y, an M×1 vector, to estimate the channel responses at associated data subcarriers. The channel responses on data subcarriers are represented by $\hat{H}$, which is an N×1 vector. By operation, the channel estimator turns out to be an N×M matrix, W, where $\hat{H}=Wy$. In view of the above, and as known in the art, a traditional MMSE channel estimator has the form of:

$$\hat{H} = Wy = R_{dp}\left(R_{pp} + \frac{I}{SNR}\right)^{-1} y \qquad (1)$$

where $R_{dp}=E\{h_d^H h_p\}$ represents the correlation matrix between data subcarrier and pilot locations where $h_d$ and $h_p$ denote channel response vector at data subcarriers and pilot subcarriers, respectively. Further, $R_{pp}=E\{h_p^H h_p\}$ represents the correlation matrix between pilot locations.

According to the equation (1), the contribution from an interfering BS is simply treated as noise. Also, from equation (1), the matrix term, I, is an M×M identity matrix and represents a channel inverse and considers the channel correlation as well as a noise term. As seen, the matrix I is divided by SNR. A channel estimator of this form has the function of filtering out a certain amount of noise. In any event, however, equation (1) merely treats interference as noise, and therefore, provides limited benefit in a high-interference environment.

According to embodiments described herein, pilot patterns associated with a serving BS and pilot signals associated with an interfering BS are separated from one another and independently measured. According to a preferred embodiment, the measured pilot patterns are then utilized to better distinguish noise, e.g., background noise, from interfering signals. Generally, a MMSE channel estimator scheme (i.e., that shown at equation (1)) will involve 2-D Weiner filtering across multiple clusters and symbols. However, for the sake of simplicity, this discussion will only consider a 2-D MMSE channel estimator with one cluster, which interpolates/extrapolates channel responses at 28 subcarriers from 4 available pilot tones. To further simplify the present discussion, the case of a single, dominant inference source is considered. However, as will be discussed in greater detail, where there are multiple comparable interference sources, the algorithms derived herein can be easily extended, albeit at the cost of some increased complexity.

Figure 4:
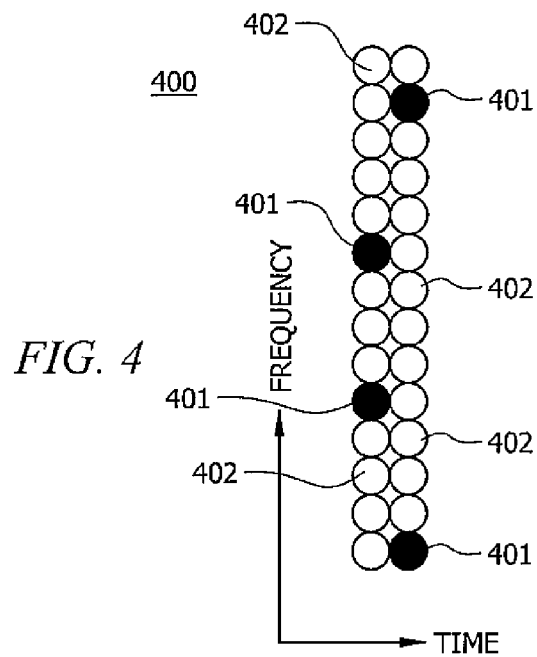
FIG. 4 is a representation of a data packet pilot structure according to an embodiment of the present invention.

FIG. 4 is a representation of a WiMAX pilot structure 400 in a data packet of a PUSC cluster. The shaded circles 401 represent pilot locations and the blank circles 402 represent data subcarriers. According to FIG. 4, the pilot and subcarrier locations are represented as a time/frequency grid of subcarriers. According to embodiments described herein, channel measurements and pilot channel measurements are used to estimate channel performance, or channel estimation of data subcarriers in a data packet. As known in the art, pilot symbols and payload subcarriers are correlated, as such, an estimation of pilot symbol signals can be used to predict data subcarrier signals. That is, measured pilot channel responses or signal levels can be utilized to predict data subcarrier channel responses or signal levels. In contrast, interference and noise are not correlated with one another. Accordingly, by filtering out uncorrelated noise, one can extract other information while using the pilot symbol locations to predict data subcarriers. In any event, there is a direct relationship between the number of multi-carriers present and the channel type. As a result, a statistical model can be compiled between pilot locations and payload subcarrier locations.

Figure 5:
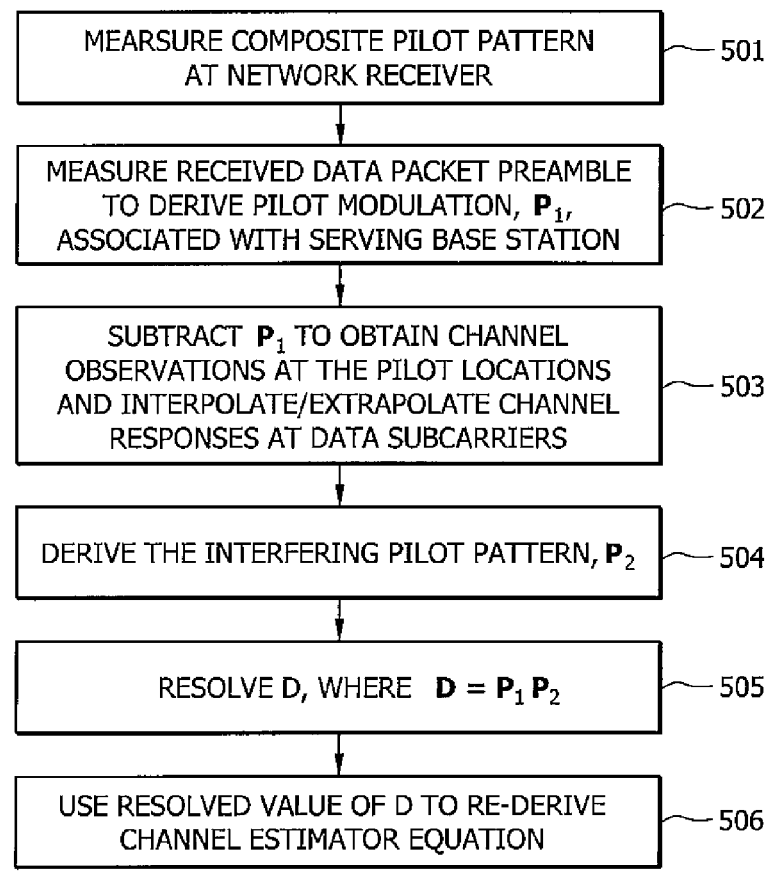
FIG. 5 is a flow diagram according to an embodiment of the present invention.

Referring to FIG. 5, a method of resolving pilot patterns associated with a serving BS and an interfering BS is outlined. At 501, a composite pilot pattern (i.e., a signal comprising pilot patterns from a serving BS and one or more interfering BSs) at a receiver is measured. For channel estimation purposes, the composite pilot signal at a receiver can be expressed as:

$$y = P_1 H_1 + P_2 H_2 + n \qquad (2)$$

where $H_1$ is a 4×1 column vector of frequency domain channel responses from a serving BS and $H_2$ is a 4×1 column vector representing frequency domain channel responses of an interfering BS. $P_1$ is a 4×4 diagonal matrix having elements that correspond to the pilot patterns of the serving BS (being randomly scrambled at different cells/sectors) and $P_2$ is a 4×4 diagonal matrix having elements that correspond to pilot patterns of an interfering BS (again being randomly scrambled at different cells/sectors). Finally, n is additive white Gaussian noise.

Referring to equation (2), it is easily seen that the contributions from an interfering BS signal and noise greatly affect channel estimation performance. This is particularly true where a receiver is located at a cell boundary such that $H_2$ is on the same order as $H_1$. According to previous methods, no particular treatment is given to the interfering signal component, $P_2 H_2$. Instead the interfering signal component is simply treated as additional noise. Therefore, channel estimation performance is limited by the corresponding SINK value instead of the SNR value. To improve channel estimation performance, the interference component should be leveraged to distinguish interference from noise.

At 502, $P_1$, the pilot modulation associated with the serving BS is derived. This is accomplished by detecting the received WiMAX data packet preamble and resolving which BS is connected to the receiver. In practice, the preamble sequence is defined during network development during cell planning. As such, the preamble sequence for each cell is unique. Detecting the preamble to identify a serving BS serves to correlate all possible preamble sequences with the receiving signal and decide which preamble matches. This can be done by determining the existence of a correlation peak. Once the preamble is determined, i.e., a SS has determined which cell it is in, the SS can derive the pilot subcarrier modulation sequence; as such, the sequence is a function of preamble index as defined by the WiMAX standard.

At 503, the determined value of $P_1$ is divided from the measured value of the signal y to obtain channel observations at the pilot locations and is then used to interpolate/extrapolate channel responses at data subcarriers associated with the serving basestation. This can be executed using MMSE channel estimation algorithms or other means known in the art. As mentioned, if no special treatment is given to the interference, $P_2 H_2$ is then simply handled as additional noise, and therefore, the channel estimation performance is limited by the SINR value (as opposed to the SNR value). As such, to further improve the channel estimation performance, the components should be leveraged to distinguish interference from noise.

Accordingly, at 504, the interfering pilot pattern $P_2$ is derived. Typically, pilot signals from the dominant interference source is comparable to the pilot signal from the serving BS. As such, $P_2$ can be found in a manner similar to that of finding $P_1$ above. That is, the received interfering WiMAX data packet preamble is measured and the interfering BS is identified. $P_2$ can be used to obtain channel observations at the pilot locations and is then used to interpolate/extrapolate channel responses at data subcarriers associated with the interfering basestation.

As seen from the above, $P_1$ is derived by analyzing the preamble of the received data from the serving BS and $P_2$ is derived by analyzing the preamble of the received WiMAX data from the interfering BS. As will now be discussed, knowledge of $P_1$ and $P_2$ can be used to modify the equation (1) above.

That is, at 505, the value D is resolved, where $D = P_1 P_2$ represents a diagonal matrix having diagonal elements that are the product of the pilot pattern associated with the serving BS, $P_1$, and the pilot pattern associated with an interfering signal (e.g., a signal from an interfering BS), $P_2$. It should be appreciated that D may represent different clusters, and therefore, different channel estimation coefficients are needed for different clusters.

In view of the above, at 506, D is used to re-derive equation (1) as follows:

$$\hat{H} = Wy = R_{dp}\left(R_{pp} + \frac{1}{SIR} DR_{pp}D + \frac{I}{SNR}\right)^{-1} y \qquad (3)$$

As seen from equation (3), the component attributable to interference is now considered and is represented as an additional channel inverse term. That is, the 1/SIR term represents the signal-to-interference ratio. By tracking this term, MMSE performance can be greatly improved by considering the interference structure.

As mentioned, the inventive concepts described above can be extended to the case where multiple sources of interference are considered. In such case, the received signal is expressed as:

$$y = P_1 H_1 + \sum_{k=2}^{K} P_k H_k + n$$

where the summation now includes the interference from multiple (i.e., K−1 in this case) sources.

The modified MMSE estimation described above is extended to the following form:

$$\hat{H} = Wy = R_{dp}\left(R_{pp} + \sum_{k=2}^{K} \frac{1}{SIR_k} D_k R_{pp} D_k + \frac{I}{SNR}\right)^{-1} y$$

where, $D_k = P_1 P_k$ and $1/SIR_k$ represents the signal-to-the-kth-interference ratio.

Figure 6:
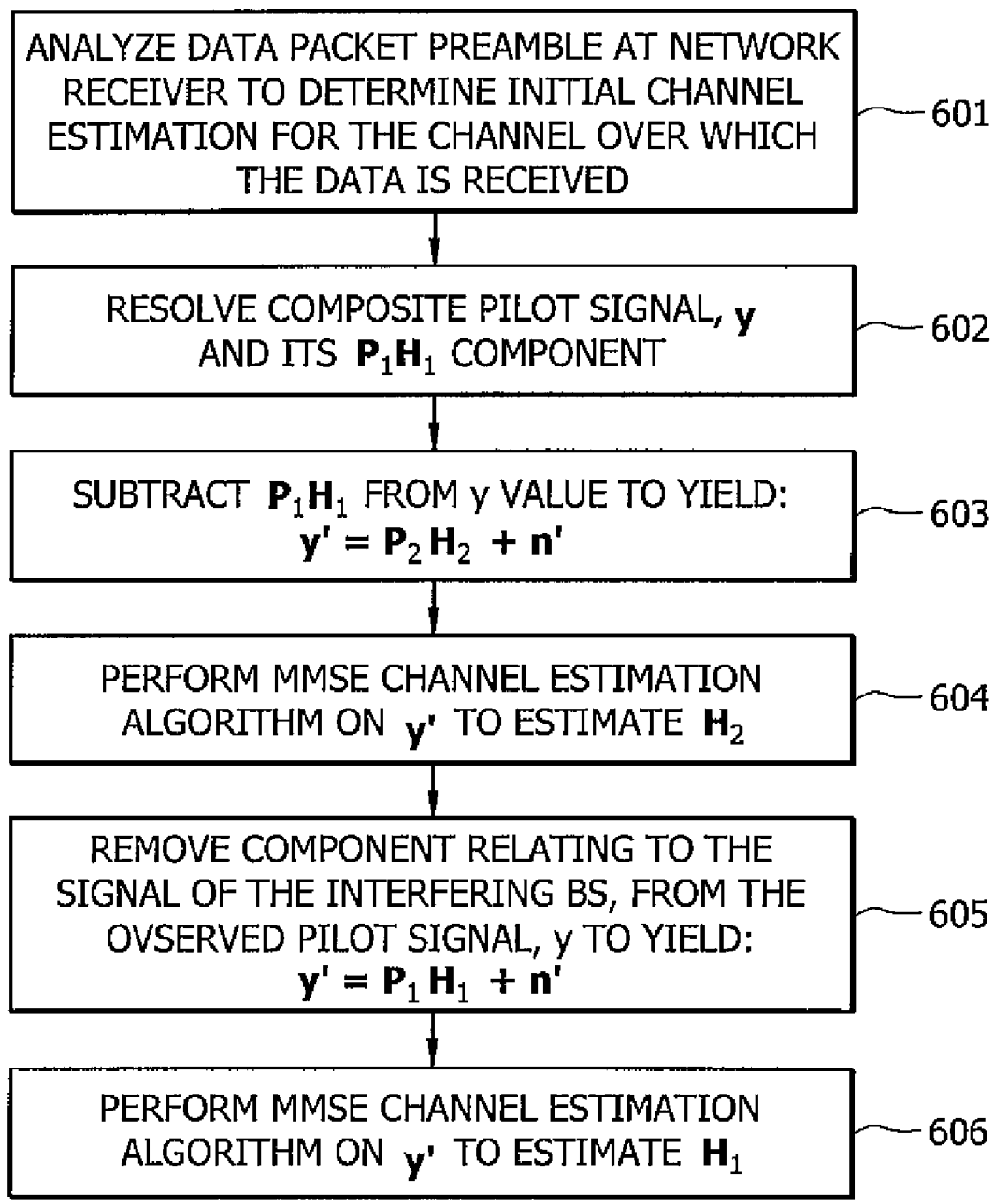
FIG. 6 is a flow diagram according to another embodiment of the present invention.

Referring to FIG. 6, an alternative embodiment of the present invention is discussed. According to this embodiment, Successive Interference Cancellation (SIC) algorithms are utilized to estimate dominant interference signals and successively cancel those signals to provide better channel estimation. Similar to previous embodiments discussed herein, the SIC algorithm can be applied in various types of networks. However, for the sake of efficient discussion, the embodiment will be described in the context of a WiMAX network. In describing the embodiment according to FIG. 6, references will be made to the network system in FIG. 2, which is meant to exemplify a network having typical components (e.g., BSs and SSs that may be employed in a number of different networks) that may be utilized herein. As will be further discussed, the embodiment according to FIG. 6 provides an iterative process where measurements are successively taken on a number a pilot symbols to provide improved channel estimation. These measurements can be performed at the BS, the SS, or both. However, the following discussion will assume the measurements are performed at a SS.

At 601, an SS, for example SS 202-1 shown in FIG. 2, analyzes the preamble of received data packets to determine an initial channel estimation for the channel over which the data is received. Performing an initial measurement of the data preamble is advantageous because the data preamble component is generally subject to a less aggressive frequency reuse factor, and therefore, subject to less interference. For example, in a typical WiMAX network, the data preamble is subject to a frequency reuse factor of ⅓, whereas the remaining portion of the data is subject to a frequency reuse factor 1. Moreover, pilot symbols in the preamble portion are more condensed than in the remaining data portion. As such, it is typically easier to perform channel estimation using pilot symbols in the preamble. For these reasons, it is reasonable to assume that the preamble measurements will provide sufficiently accurate channel estimation to serve as an initial value to initialize execution of the SIC algorithm.

Consider again the equation, where the composite pilot signal at a SS is represented by:

$$y = P_1 H_1 + P_2 H_2 + n$$

where $H_I$ is a 4×1 column vector of frequency domain channel responses from a serving BS and $H_2$ is a 4×1 column vector representing frequency domain channel responses of an interfering BS. $P_1$ is a 4×4 diagonal matrix having elements that correspond to the pilot patterns of the serving BS (being randomly scrambled at different cells/sectors) and $P_2$ is a 4×4 diagonal matrix having elements that correspond to pilot patterns of an interfering BS (again being randomly scrambled at different cells/sectors). Finally, n is additive white Gaussian noise.

At 602, y and its components are resolved to the extent possible. That is, the composite pilot signal, y, is measured and contributing signals that comprise y are identified. The $P_1 H_1$ component is first measured after deriving $P_I$ by detecting the preamble (as described above) and determining which BS is the serving BS. In similar fashion, interfering BSs can be resolved by, for example, measuring the preambles of data packets received from those interfering BSs.

At 603, the $P_1 H_I$ value is subtracted from the measured y value. This subtraction effectively isolates the signal from the interfering BS, resulting in:

$$y' = P_2 H_2 + n'$$

where n' comprises the residual signal of the serving BS and additive Gaussian noise.

At 604, a traditional MMSE channel estimation algorithm is performed on y' to estimate the value of the $H_2$, i.e., the signal attributable to interfering BSs.

At 605, the now-resolved component relating to the signal of the interfering BS, $P_2 H_2$, is removed from the observed pilot signal, y. This results in:

$$y' = P_1 H_1 + n'$$

At 606, a traditional MMSE channel estimation algorithm is performed on y" to estimate the value of the $H_1$, i.e., the signal attributable to the serving BS.

It should be appreciated that 603-606 can be iterated a number of times to further refine the channel estimate, in accordance with the performance requirements of the corresponding communication network, for a given pilot symbol. The refined channel estimate value of $H_1$ for a given pilot symbol can then be used as an initial value of $H_1$ for a next iteration of steps 603-606, as they are performed on a subsequent pilot symbol.

The inventive concepts outlined in FIG. 6 and its accompanying description can also be extended to the case where multiple interference sources are considered. In such case, for the SIC algorithm, all the interference sources are first ordered according to their power level, i.e., $|H_1| \geqq |H_2| \geqq \ldots |H_K|$.

For each iteration, the SIC algorithm will involve K number of sub-steps and will always start from the weakest interfering signal (i.e., the Kth interferer) to the strongest interferer. The sub-steps are outlined below:

At sub-step 1: Subtract the other components $P_1 H_1$ through $P_{K-1} H_{K-1}$, using the channel estimation from the previous iteration (or the initialization value if this is the first iteration). The resulting signal becomes $y' = P_K H_K + n'$ where n' comprises the residual signal of other sources and additive Gaussian noise. At this point, $H_K$ is calculated using conventional MMSE or other form of channel estimator.

At sub-step 2: subtract the other components $P_1 H_1$ through $P_{K-2} H_{K-2}$ using the channel estimation from the previous iteration, and $P_k H_k$ that has just been updated in sub-step 1. The resulting signal becomes $y' = P_{K-1} H_{K-1} + n'$, where n' comprises the residual signal of other sources and additive Gaussian noise. At this point, $H_{K-1}$ is calculated using conventional MMSE or other form of channel estimator.

At sub-step 3: subtract the other components $P_1 H_1$ through $P_{K-3} H_{K-3}$ using the channel estimation from the previous iteration, and $P_{k-1} H_{k-1}$ and $P_k H_k$ that have just been updated in sub-steps 1 and 2. The resulting signal becomes $y' = P_{K-2} H_{K-2} + n'$, where n' comprises the residual signal of other sources and additive Gaussian noise. At this point, $H_{K-2}$ is calculated using conventional MMSE or other form of channel estimator.

The sub steps are continued through K number of interfering sources, such that at sub-step K: subtract the other components $P_2 H_2$ through $P_K H_K$ that have just been updated from sub-step 1 through K-1. The resulting signal becomes $y' = P_1 H_1 + n'$, where n' comprises the residual signal of other sources and additive Gaussian noise. At this point, $H_1$ is calculated using conventional MMSE or other form of channel estimator.

The above sub-steps represents one iterations and corresponds to step 603 through 606 outlined above. These sub-steps may be iterated several times until convergence or a satisfactory performance is achieved.

The initialization value to prompt the SIC algorithm is based on the preamble measurements, similar to that outlined above at step 602. An initial estimate of $P_1 H_1$ through $P_{K-1} H_{K-1}$ must be resolved based on the preamble with the presence of other interfering sources.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A wireless communication network channel estimation method, said method comprising:
   measuring pilot signals at a receiver;
   determining a first portion of said measured pilot signals attributable to a serving transmitter;
   determining at least one second portion of said measured pilot signals attributable to at least one interfering transmitter;
   estimating data subcarrier responses of said serving transmitter and said at least one interfering transmitter from said determined first portion and said determined at least one second portion, respectively, said estimating said data subcarrier responses including tracking signal-to-$k^{th}$-interference ratios ($1/S/R_k$) from said at least one interfering transmitter, said tracking said signal-to-$k^{th}$ interference ratios ($1/SIR_k$) including using a minimum mean square error channel estimation which includes solving $$\sum_{k=2}^{K} \frac{1}{SIR_k} D_k R_{pp} D_k$$

wherein $D_k$ is a product of said determined first portion and a $k^{th}$ determined portion of said determined at least one second portion, K is the number of said at least one interfering transmitter plus one, $R_{pp}$ is a correlation matrix between pilot locations, and SNR is a signal-to-noise ratio of said measured pilot signals; and
   reducing interference from said at least one interfering transmitter on signals from said serving transmitter by utilizing said estimating said data subcarrier responses.

2. The method of claim 1, wherein said tracking said signal-to-$k^{th}$-interference ratios ($1/S/R_k$) comprises solving $$\hat{H} = Wy = R_{dp}\left(R_{pp} + \sum_{k=2}^{K} \frac{1}{SIR_k} D_k R_{pp} D_k + \frac{I}{SNR}\right)^{-1} y,$$

wherein $\hat{H}$ is channel responses on data subcarriers, W is a channel estimator, $R_{dp}$ is a correlation matrix between data subcarrier and pilot locations, I is an identity matrix, y is channel observations at subcarriers for said measured pilot signals, and SNR is a signal-to-noise ratio of said measured pilot signals.

3. The method of claim 1, wherein said determining said first portion comprises determining a data packet preamble associated with said serving transmitter.

4. The method of claim 1, wherein said determining said at least one second portion comprises determining a data packet preamble associated with said at least one interfering transmitter.

5. The method of claim 1, wherein said wireless communication network is a WiMAX network.

6. The method of claim 1, wherein one interfering transmitter of said at least one interfering transmitter produces the strongest interfering signal at said receiver.

7. A non-transitory computer readable medium containing program instructions for controlling certain aspects of a wireless communication network, said program instructions comprising code for:
   measuring pilot signals at a receiver;
   determining a first portion of said measured pilot signals attributable to a serving transmitter;
   determining at least one second portion of said measured pilot signals attributable to at least one interfering transmitter;
   estimating data subcarrier responses of said serving transmitter and said at least one interfering transmitter from said determined first portion and said determined at least one second portion, respectively, said estimating said data subcarrier responses including tracking signal-to-$k^{th}$-interference ratios ($1/S/R_k$) from said at least one interfering transmitter, said tracking said signal-to-$k^{th}$-interference ratios ($1/S/R_k$) including using a minimum mean square error channel estimation which includes solving $$\sum_{k=2}^{K} \frac{1}{SIR_k} D_k R_{pp} D_k$$

wherein $D_k$ is a product of said determined first portion and a $k^{th}$ determined portion of said determined at least one second portion, K is the number of said at least one interfering transmitter plus one, $R_{pp}$ is a correlation matrix between pilot locations, and SNR is a signal-to-noise ratio of said measured pilot signals; and
   reducing interference from said at least one interfering transmitter on signals from said serving transmitter by utilizing estimated data subcarrier responses from said estimating said data subcarrier responses.

8. The medium of claim 7, wherein said tracking said signal-to-$k^{th}$-interference ratios ($1/S/R_k$) comprises solving $$\hat{H} = Wy = R_{dp}\left(R_{pp} + \sum_{k=2}^{K} \frac{1}{SIR_k} D_k R_{pp} D_k + \frac{I}{SNR}\right)^{-1} y,$$

wherein $\hat{H}$ is channel responses on data subcarriers, W is a channel estimator, $R_{dp}$ is a correlation matrix between data subcarrier and pilot locations, I is an identity matrix, y is channel observations at subcarriers for said measured pilot signals, and SNR is a signal-to-noise ratio of said measured pilot signals.

9. The medium of claim 7, wherein said determining a first portion comprises determining a data packet preamble associated with said serving transmitter.

10. The medium of claim 7, wherein said determining said at least one second portion comprises determining a data packet preamble associated with said at least one interfering transmitter.

11. A wireless communication network channel estimation method, said method comprising:
    measuring noise levels at one or more pilot channels;
    determining at least one first portion corresponding to at least one serving transmitter at said one or more pilot channels;
    determining at least one second portion of said measured noise levels at said one or more pilot channels attributable to at least one interfering transmitter;

isolating said determined at least one second portion from said measured noise levels;

estimating data subcarrier responses of said at least one interfering transmitter from said determined portion, said estimating said data subcarrier responses including tracking signal-to-$k^{th}$-interference ratios (1/S/$R_k$) from said at least one interfering transmitter, said tracking said signal-to-$k^{th}$-interference ratios (1/S/$R_k$) including using a minimum mean square error channel estimation which includes solving $$\sum_{k=2}^{K} \frac{1}{SIR_k} D_k R_{pp} D_k$$

wherein $D_k$ is a product of said determined first portion and a $k^{th}$ determined portion of said determined at least one second portion, K is the number of said at least one interfering transmitter plus one, $R_{pp}$ is a correlation matrix between pilot locations, and SNR is a signal-to-noise ratio of said measured pilot signals;

adding said estimated data subcarrier responses of said interfering transmitter to other estimated data subcarrier responses to improve channel estimation; and reducing interference from said at least one interfering transmitter on signals from said at least one serving transmitter by utilizing said improved channel estimation.

12. The method of claim 11, wherein said determining said at least one first portion comprises determining a data packet preamble associated with said at least one serving transmitter.

13. The method of claim 11, wherein said wireless communication network is a WiMAX network.

14. The method of claim 11, wherein one interfering transmitter of said at least one interfering transmitter produces the strongest interfering signal.

15. The method of claim 11, wherein said tracking said signal-to-$k^{th}$-interference ratios (1/S/$R_k$) includes solving $$\hat{H} = Wy = R_{dp}\left(R_{pp} + \sum_{k=2}^{K} \frac{1}{SIR_k} D_k R_{pp} D_k + \frac{I}{SNR}\right)^{-1} y,$$

wherein $\hat{H}$ is channel responses on data subcarriers, W is a channel estimator, $R_{dp}$ is a correlation matrix between data subcarrier and pilot locations, I is an identity matrix, y is channel observations at subcarriers for said measured pilot signals, and SNR is a signal-to-noise ratio of said measured pilot signals.

16. A wireless unit, said unit comprising:
circuitry adapted for measuring signal levels at one or more pilot channels;
circuitry adapted for determining a first portion of said measured signal levels attributable to a serving transmitter;
circuitry adapted for determining at least one second portion of said measured signal levels at said one or more pilot channels attributable to at least one interfering transmitter;
circuitry adapted for isolating said determined first portion from said measured signal levels;
circuitry adapted for estimating data subcarrier responses of said at least one interfering transmitter from said determined at least one second portion, said circuitry adapted for estimating said data subcarrier responses being adapted for tracking signal-to-$k^{th}$-interference ratios (1/S/$R_k$) from said at least one interfering transmitter using a minimum mean square error channel estimation which includes solving $$\sum_{k=2}^{K} \frac{1}{SIR_k} D_k R_{pp} D_k$$

wherein $D_k$ is a product of said determined first portion and a $k^{th}$ determined portion of said at least one determined second portion, K is the number of said at least one interfering transmitter plus one, $R_{pp}$ is a correlation matrix between pilot locations, and SNR is a signal-to-noise ratio of said measured pilot signals.

17. The unit of claim 16, wherein said circuitry adapted for determining said determined first portion comprises circuitry adapted for determining a data packet preamble associated with a serving transmitter.

18. The unit of claim 16, wherein said circuitry adapted for estimating and tracking solves $$\hat{H} = Wy = R_{dp}\left(R_{pp} + \sum_{k=2}^{K} \frac{1}{SIR_k} D_k R_{pp} D_k + \frac{I}{SNR}\right)^{-1} y,$$

wherein $\hat{H}$ is channel responses on data subcarriers, W is a channel estimator, $R_{dp}$ is a correlation matrix between data subcarrier and pilot locations, I is an identity matrix, y is channel observations at subcarriers for said measured pilot signals, and SNR is a signal-to-noise ratio of said measured pilot signals.

* * * * *

UNITED STATES PATENT AND TRADEMARK OFFICE
CERTIFICATE OF CORRECTION

PATENT NO. : 8,275,320 B1
APPLICATION NO. : 12/024675
DATED : September 25, 2012
INVENTOR(S) : Guanbin Xing et al.

It is certified that error appears in the above-identified patent and that said Letters Patent is hereby corrected as shown below:

Title Page 1, Item (56), Other Publications:
Column 2, line 5 (including headings), change "802.16/2004/Cor1-2005" to --802.16-2004/Cor1-2005--;

In the Claims:

Column 13:
Line 21, Claim 1, change "$(1/S/R_k)$" to --$(1/SIR_k)$--;
Line 43, Claim 2, change "$(1/S/R_k)$" to --$(1/SIR_k)$--;

Column 14:
Line 16, Claim 7, change "$(1/S/R_k)$" to --$(1/SIR_k)$--;
Line 18, Claim 7, change "$(1/S/R_k)$" to --$(1/SIR_k)$--;
Line 39, Claim 8, change "$(1/S/R_k)$" to --$(1/SIR_k)$--;

Column 15:
Line 6, Claim 11, change "$(1/S/R_k)$" to --$(1/SIR_k)$--;
Line 8, Claim 11, change "$(1/S/R_k)$" to --$(1/SIR_k)$--;
Line 40, Claim 15, change "$(1/S/R_k)$" to --$(1/SIR_k)$--; and Column 16:
Line 18, Claim 16, change "$(1/S/R_k)$" to --$(1/SIR_k)$--.

Signed and Sealed this
Seventeenth Day of September, 2013

Teresa Stanek Rea
*Deputy Director of the United States Patent and Trademark Office*